United States Patent [19]
Hoffman

[11] 3,956,045
[45] May 11, 1976

[54] METHOD AND APPARATUS FOR BONDING LAYERS OF RESINOUS MATERIAL

[76] Inventor: Louis S. Hoffman, Evans Farm Road, Morristown, N.J. 07960

[22] Filed: Mar. 25, 1974

[21] Appl. No.: 454,714

Related U.S. Application Data

[63] Continuation of Ser. No. 210,523, Dec. 21, 1971, abandoned.

[52] U.S. Cl. .................. 156/73.4; 53/39; 156/227; 156/306; 156/272; 428/480
[51] Int. Cl.² ............... B32B 31/16; B29C 19/02; C09J 5/00
[58] Field of Search .......... 53/39, 41; 156/73.4, 156/272, 273, 289, 306, 227, 155; 428/480, 121, 124; 93/DIG. 1

[56] References Cited

UNITED STATES PATENTS

| | | | |
|---|---|---|---|
| 2,265,075 | 12/1941 | Knoetter | 156/306 X |
| 2,584,633 | 2/1952 | Southwick | 156/306 |
| 2,796,913 | 6/1957 | Fener et al. | 156/272 X |
| 3,379,595 | 4/1968 | Bracey | 156/306 |
| 3,399,506 | 9/1968 | Howe | 53/39 |
| 3,459,610 | 8/1969 | Dijkers et al. | 156/306 X |
| 3,505,146 | 4/1970 | Borough | 156/273 |
| 3,506,516 | 4/1970 | Baumann | 156/306 |

FOREIGN PATENTS OR APPLICATIONS

| | | | |
|---|---|---|---|
| 681,541 | 3/1964 | Canada | 156/227 |
| 989,748 | 4/1965 | United Kingdom | |

Primary Examiner—William A. Powell
Assistant Examiner—J. J. Gallagher
Attorney, Agent, or Firm—Kenyon & Kenyon, Reilly Carr & Chapin

[57] ABSTRACT

A method and apparatus for bonding at least two films of resinous material such as polyester films to one another wherein at least a portion of one surface of one polyester film is placed contiguous with at least a portion of one surface of the other polyester films adjacent thereto. At least one layer of resinous material such as a layer of polyester is placed adjacent each of the other surfaces of the polyester films to be bonded and opposite the contiguous portions of the surfaces. The contiguous portions of the polyester films to be bonded are compressed against one another by pressure applied to the two outermost layers of polyester. The temperature of the contiguous portions along their interface is raised at least to a bonding temperature of the polyester by energy transmitted through the layers of polyester on each side of the two polyester films. When the energy, and subsequently the pressure, are removed from the polyester films, a bond is formed between the contiguous surfaces of the polyester films.

13 Claims, 23 Drawing Figures

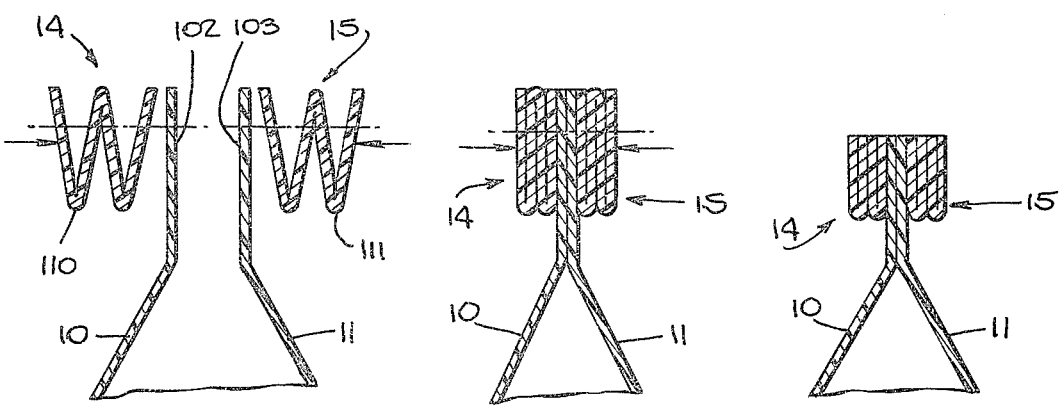
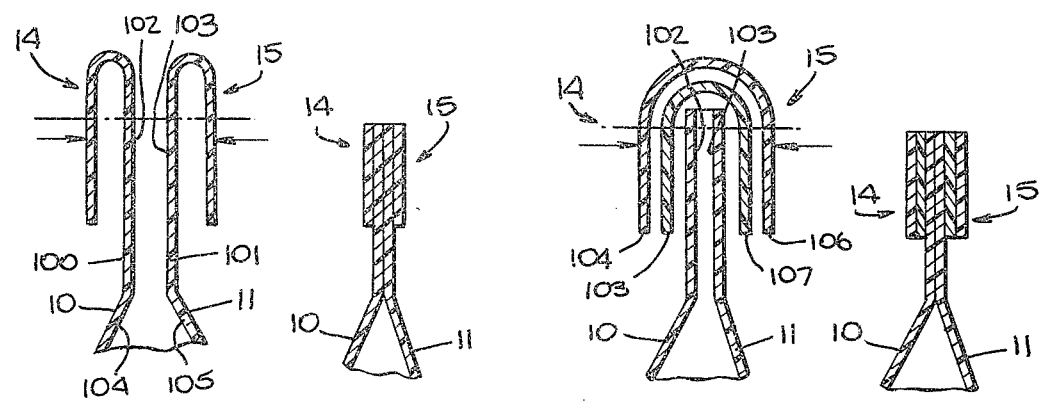
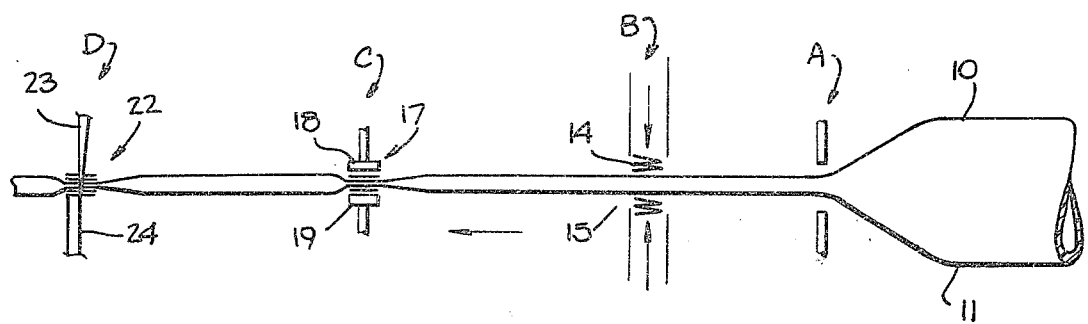

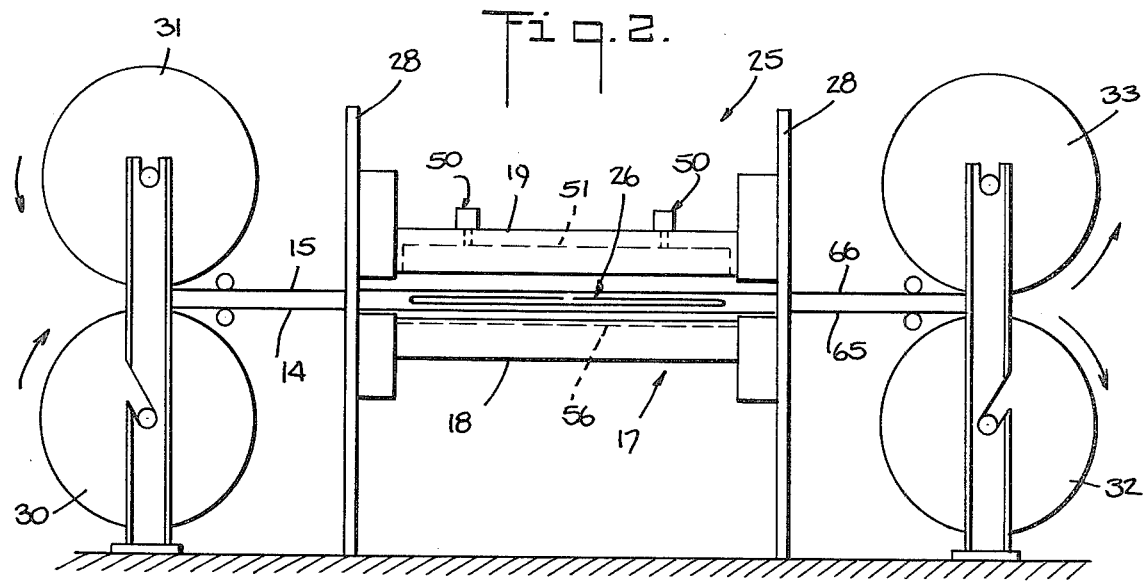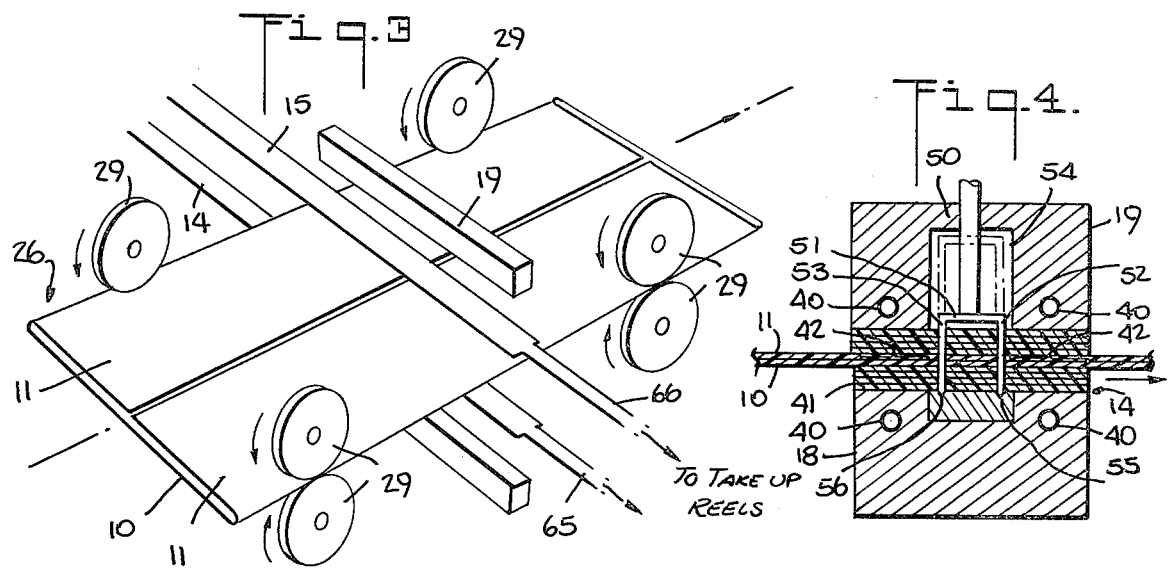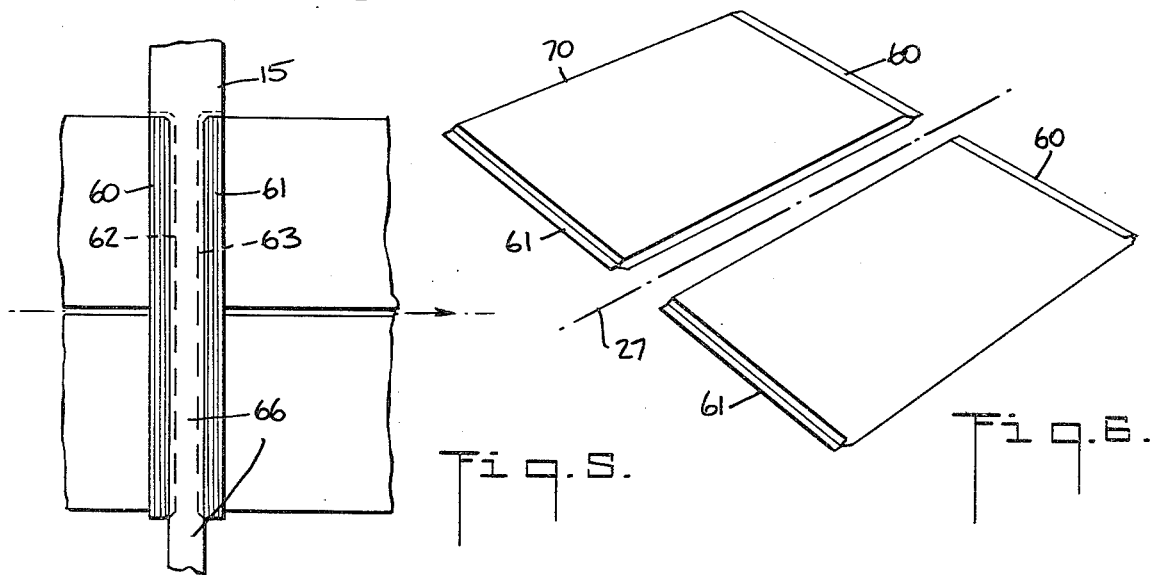

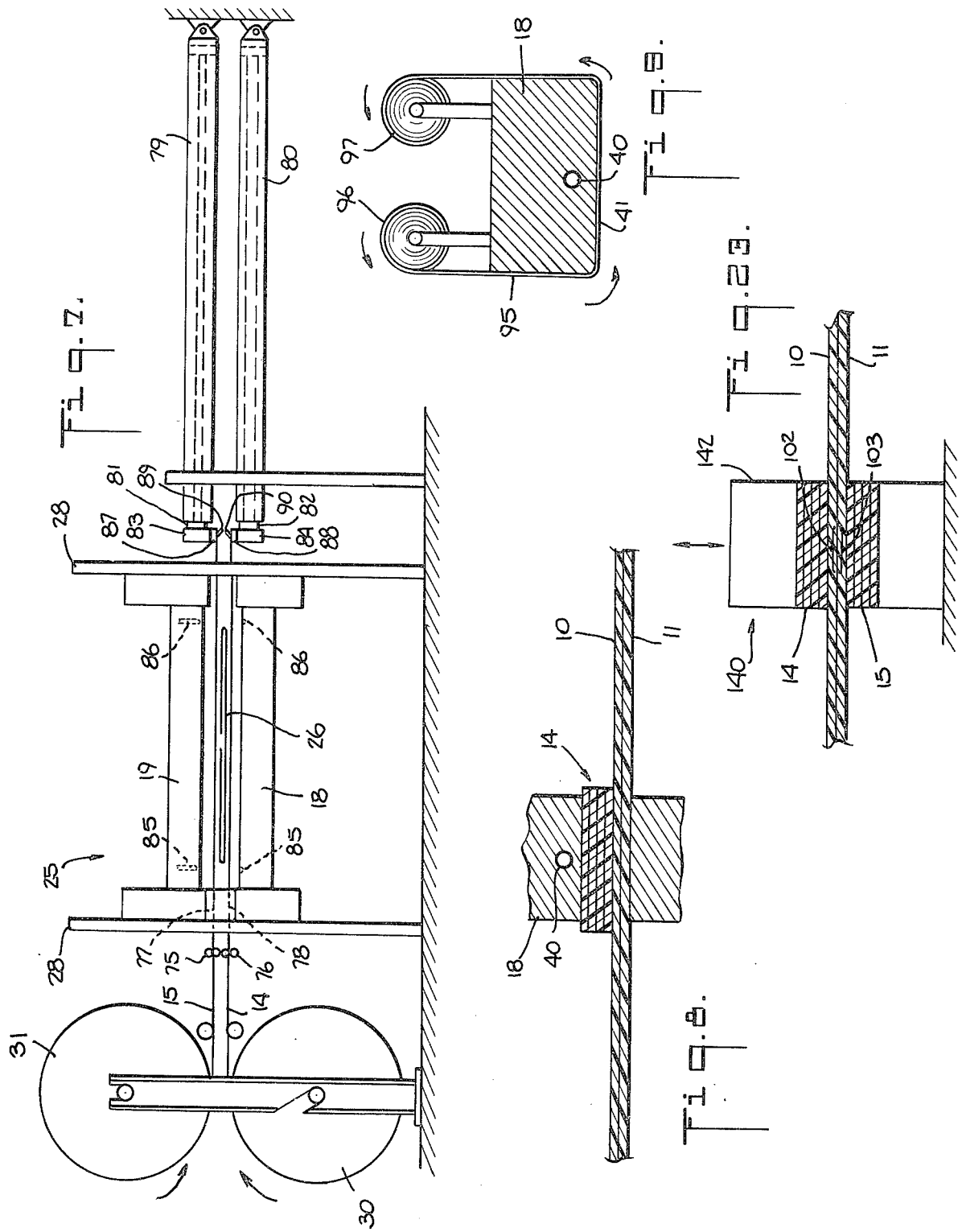

METHOD AND APPARATUS FOR BONDING LAYERS OF RESINOUS MATERIAL

This is a continuation of application Ser. No. 210,523 filed Dec. 21, 1971, now abandoned.

BACKGROUND OF THE INVENTION

This invention generally relates to a method and apparatus for bonding films of resinous material to one another and to the article formed thereby. More particularly, the invention relates to bonding polyester films.

Films of resinous material such as polyester films have been available for many years, and they have been put to numerous uses. One particular application for such films of resinous materials is in the manufacture of bags or packages, for example, for the food packaging industry where packages are continually being designed to lessen the work of housewives. In particular, frozen or refrigerated food products which are generally heated or cooked before being served can be packaged in bags formed from films of resinous materials, for example, polyester films. Such bags or packages with their contents can be placed directly into a warm oven or in a pot of boiling water so that the foods can be heated or cooked before serving. Polyester films are particularly desirable for such applications in that they are transparent, durable, and chemically inert, and they have outstanding barrier properties.

In order to form a bag or package from polyester films, the films must be bonded together or sealed in some manner. One method of sealing polyester films is to coat the films with a readily heat-sealable material such as polyethylene in the area of the bond and then heat-seal the coatings to one another. However, bonds formed in this manner are generally incapable of withstanding elevated temperatures, for example, the temperature required to cook a roast in an oven. Another method has been to employ a cement material to bond the polyester films together, but such methods present difficult production problems. One other known method for bonding polyester films is to apply heat directly to the polyester films to be heat-sealed. However, this latter method will not always form a bond between the polyester films, particularly when the bond is formed under conditions which would permit the bond to be used for commercial applications. Further, when a bond is formed between the polyester films the areas of the films adjacent the bond generally deteriorate. Thus, even if the bond has sufficient strength characteristics, the areas of the polyester films around the bond will not have sufficient strength for many commercial applications.

Accordingly, difficulty has heretofore been experienced in forming a satisfactory seal directly between films of resinous material such as polyester films, and various methods have been substituted which employ an intermediate sealing material. Consequently, there is no known method available for directly bonding polyester films to one another which has extensive commercial applications. In particular, known methods for bonding polyester films do not form a seal capable of withstanding elevated temperatures and which has sufficient strength for many of the most advantageous applications of the film.

SUMMARY OF THE INVENTION

The present invention provides a method and apparatus for bonding contiguous portions of the surfaces of adjacent films of resinous material, although it is particularly advantageous for bonding polyester films which have heretofore been difficult or impossible to directly bond to one another. According to the present invention, at least one layer of resinous material is placed adjacent at least one side of the adjacent films of resinous material and contigous therewith opposite the portions of the films of resinous material to be bonded to one another. When the portions to be bonded are compressed against one another, the portions become contiguous along the interface formed therebetween, and energy is transmitted through the layers of resinous material to raise the temperature of the contiguous portions along their interface to a bonding temperature for the resinous material of the films, thus forming a bond between the contiguous surfaces of the layers of resinous material.

The films of resinous material can be bonded to one another by one of several known bonding means where energy is applied to the portions of the films to be bonded while they are being compressed, although known bonding means must generally be slightly modified to provide the layers of resinous material. Energy can be transmitted through the layers of resinous material by one of several known means for raising the temperature of two or more contiguous portions along their interface; for example, a bonding means which applies energy in the form of heat directly to the layers of resinous material, such as an impulse-heat sealing means, or a bonding means which heats the interface between the contiguous portions by cyclically compressing the layers of resinous material, such as an ultrasonic welding means.

One preferred means for transmitting heat to the contiguous portion of the films of resinous material through the layers of resinous material is an impulse heat-sealing means which utilizes a pulse of heat to raise the temperature. One type of impulse heat-sealing means generally comprises a first jaw member and a second jaw member. When the heat-sealing means is not actuated, the first jaw member is spaced-apart from the second jaw member. Upon actuation of the heat-sealing means, the first and/or second jaw members are urged toward one another to apply pressure to a material disposed therebetween. A heating means disposed in one or both of the jaw members applies a pulse of heat to the material from one or both of the opposite sides thereof.

Thus, according to one preferred method of the present invention, two films of resinous material such as two polyester films can be bonded together by placing a portion of one surface of one polyester film contiguous with a portion of one surface of the other polyester film, thus forming an interface between the contiguous portions to be bonded. The contiguous portions of the polyester films are placed between the spaced-apart jaw members of an impulse heat-sealing means such as described above. Four layers of polyester are placed between the other surface of each of the polyester films and the jaw member opposite thereto. When the heat-sealing means is subsequently actuated, the jaw members are urged towards one another and against the layers of polyester, thus compressing the contiguous portions of the polyester films along their interface.

The heating means in each of the jaw members applies a pulse of heat to the contiguous portions of the polyester films to be bonded to one another through the four layers of polyester film on each side of the two polyester films. The pulse of heat from each heating means increases the temperature of the contiguous portions to be bonded to a bonding temperature of the polyester, thus forming a bond between the contiguous portions. In addition, it is likely that at least one of the layers of polyester on each side of the bonded polyester films will also be bonded to the polyester films.

The bond formed between the portions of the two polyester films has improved strength, particularly, tensile strength, over bonds formed by known methods. Furthermore, the strength of the bond is very uniform along its length, and the areas of the polyester films around the bonded contiguous portions do not deteriorate to any significant extent so that they retain substantially all of their previous strength. The bond can also withstand elevated temperatures. Thus, a bond formed according to the present invention permits polyester films to be used in many commercial applications which were heretofore unavailable to polyester films.

The present invention also provides for several modifications of the above method for bonding films of resinous material such as polyester films to one another. For example, energy can be applied to the contiguous portions of the polyester films through layers of polyester placed adjacent only one side of the polyester films. Another modification of the method described above provides for the bonding together of at least two films of resinous material such as two polyester films without layers of polyester film also being bonded thereto. Thus, at least one layer of a fluorocarbon resin material, for example, the material manufactured by E. I. DuPont de Nemours & Co., Inc. under the trademark Teflon, can be placed between the contiguous portions of the polyester films to be bonded and the respective jaw members of the heat-sealing means. The heat from the jaw members is transmitted through the layers of a fluorocarbon resin material to increase the temperature of the contiguous portions to cause a bond to be formed therebetween. Bonding of the polyester films in this manner also creates a bond between contiguous portions of the polyester films; however, the layers of a fluorocarbon resin material will not be bonded to the polyester films.

The layers of resinous material adjacent one or both sides of the films of resinous material to be bonded can be formed from a single layer of resinous material having a described thickness or they can be formed from a plurality of layers of resinous material having a combined thickness equal to a desired thickness. It is believed, however, that a plurality of layers of resinous material provides a better bond between the contiguous portions of the films of resinous material, particularly when polyester films are to be bonded, than does the single layer having a thickness equal to the combined thickness of the plurality of layers.

Accordingly, it is an object of the present invention to provide a method and apparatus for bonding at least two films of resinous material such as a polyester films to one another, and the article formed thereby.

Another object of the invention is to provide a method and apparatus for forming a bond between at least two films of resinous material such as a polyester film wherein the energy for creating the bond is transmitted through at least one layer of resinous material such as a polyester film adjacent the layers of resinous material to be bonded.

Still another object of the invention is to provide such a method and apparatus wherein the energy is transmitted through four layers of resinous material such as polyester films adjacent the films of resinous material to be bonded.

Still another object of the present invention is to provide a method and apparatus for forming a bond between at least two films of resinous material such as polyester films wherein the energy for creating the bond is transmitted through at least one layer of a fluorocarbon adjacent the polyester films to be bonded.

These and other objects and advantages of the present invention are apparent from the following description, when read in view of the accompanying drawings.

BRIEF DESCRIPTION OF THE DRAWINGS

FIG. 1 is a schematic illustration of one of the methods of the present invention.

FIG. 2 shows one apparatus of the present invention for forming a bond between at least two films of resinous material by transmitting energy through layers of resinous material on both sides of the films to be bonded.

FIG. 3 is a perspective view of a portion of the apparatus of FIG. 2 showing two films of resinous material to be bonded and the four layers of resinous material on each side thereof.

FIG. 4 is a cross-sectional view of the jaw members of the apparatus of FIG. 2 showing the two films of resinous material to be bonded and the layers of resinous material therebetween.

FIG. 5 shows the two bonds formed across the two films of resinous material by the apparatus of FIG. 2.

FIG. 6 shows two bags or packages formed by the apparatus of FIG. 2.

FIG. 7 shows the apparatus of FIG. 2 having another means for providing the layers of resinous material on each side of the two films of resinous material to be bonded.

FIG. 8 shows a bond being formed between two films of resinous material by heat being transmitted through four layers of resinous material disposed on only one side of the films to be bonded.

FIG. 9 shows an upper jaw member of a heat-sealing means having a means for providing layers of a fluorocarbon resin material between the heating face thereof and the films of resinous material to be bonded.

FIG. 10 shows one means of assembling two films of resinous material to be bonded and one layer of resinous material on each of the opposite sides of the two films.

FIG. 11 shows one seal that can be formed from the films of resinous material shown in FIG. 10.

FIG. 12 shows one means of assembling two films of resinous material to be bonded to one another and two layers of resinous material on each of the opposite sides of the two films.

FIG. 13 shows one seal that can be formed from the films of resinous material shown in FIG. 12.

FIG. 14 shows one means of assembling two films of resinous material to be bonded to one another and four layers of resinous material on each of the opposite sides of the two films.

FIG. 15 shows the films of resinous material shown in FIG. 14 after the films have been compressed together by pressure applied to the layers of resinous material.

FIG. 16 shows one seal that can be formed from the films of resinous material shown in FIGS. 14 and 15.

FIG. 23 illustrates another apparatus for heating and compressing the films of resinous material to cause a bond to be formed therebetween.

DESCRIPTION OF THE EMBODIMENTS OF THE INVENTION

Figure 19:
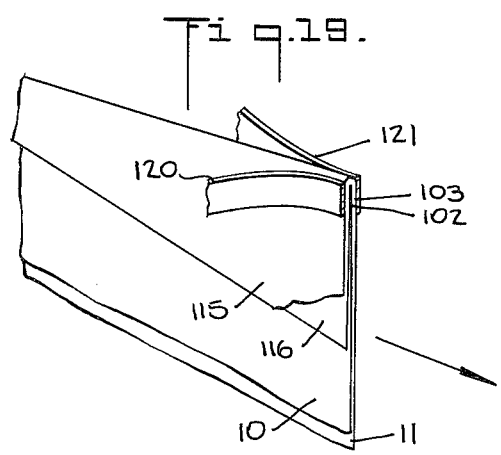
FIGS. 19–22 show one means for forming four additional layers of resinous material one each side of two films of resinous material.

FIG. 1 diagrammatically illustrates one of the methods of the present invention for bonding together at least two films of resinous material such as polyester films. Polyester films are commercially available in the form of sheets and also tubes, both of which can be used to make polyester bags or packages for food products. In FIG. 1 a tube of polyester film 15 is folded to form two opposing polyester films 10 and 11 which can subsequently be bonded to one another at predetermined intervals along the length of the tube, thus forming individual bags or compartments therebetween. Thus, the two polyester films 10 and 11 are intermittently advanced along a predetermined path in the direction of the arrow passed the various operating points designated A, B, C and D. At station A, the two polyester films 10 and 11 are formed with a portion of one surface of one of the film contiguous with a portion of one surface of the other film, thus forming an interface between the contiguous portions. The contiguous portions of the two polyester films 10 and 11 to be bonded are subsequently advanced along the path to station B.

At station B at least one layer of polyester 14 or 15 is placed adjacent each of the other surfaces of the polyester films 10 and 11 and opposite the contiguous portions thereof. As will be described more fully hereinafter, the layers of polyester 14 and 15 can be formed in various ways. For example, each layer of polyester can be separate and distinct from the other layers of polyester or the layers of polyester 14 and 15 can be formed from a single layer of polyester which is folded upon itself several times to form the required number of layers of polyester. In addition, the layers of polyester 14 and 15 can be formed from a continuous portion of the polyester films 10 and 11. The continuous portions can be folded in one of various ways about the contiguous portions of the polyester films 10 and 11 to be bonded, thereby providing the layers of polyester 14 and 15 on both sides thereof.

Once the layers of polyester 14 and 15 are formed adjacent to the contiguous portions of polyester films 10 and 11, the polyester films 10 and 11 are advanced to station C where the continguous portions of the surfaces of the polyester films 10 and 11 are bonded to one another. As described above, the bonding can be accomplished by any one of several known bonding means. The bonding means 17 schematically illustrated in FIG. 1 is an impulse heat-sealing means having a first jaw member 18 and a second jaw member 19. When the impulse heat-sealing means 17 is not actuated, the first jaw member 18 is spaced-apart from the second jaw member 19. Upon actuation of the heat-sealing means 17, the first and second jaw members 18 and 19 are urged towards one another to apply pressure to the layers of polyester on each side of the polyester films 10 and 11, thus compressing the contiguous portions of the polyester films 10 and 11 to be bonded to one another. A heating means in each of the jaw members 18 and 19 applies a pulse of heat to the contiguous portions of the polyester films 10 and 11 through each of the layers of polyester 14 and 15. The pulses of heat from the jaw members 18 and 19 increase the temperature of the contiguous portions of the polyester films 10 and 11 along their interface to at least a bonding temperature for the polyester. Once the pulse of heat has been applied, the pressure is preferably maintained by the jaw members 18 and 19 until the bond is securely formed between the contiguous portions of the polyester films.

The contiguous portions of the polyester films 10 and 11 which are now bonded to one another, and the layers of polyester 14 and 15 which are also bonded thereto can be subsequently advanced to a trimming station D where the compartments formed in the tube of polyester are separated from one another, thus forming polyester bags having an opening at one end. The trimming means 22, which can be one of several such means known in the art is schematically illustrated in FIG. 1 as a knife or blade 23 cooperating with a fixed backing member 24 to cause a shearing action therebetween.

Now referring to FIGS. 2–4, an impulse heat sealing means 25 for forming a plurality of bags or packages from a continuous web or sheet of resinous material such as polyester is shown. The heat-sealing means 25 is adapted to receive the web of polyester 26 after it has been folded in accordance with a known side weld bag forming technique wherein both outer portions 11 of the web 26 are folded upon the central portion 10 of the web so that the edges of the web are adjacent one another along the longitudinal axis 27 of the web. Thus, the central portion of the web forms one polyester film 10, and the outer portions of the web form two polyester films 11 to be bonded to the polyester film 10. As will be described below, the impulse heat-sealing means 25 forms a pair of spaced apart bonds across the width of the web at preselected intervals along the length of the web. Thus two bags or packages are formed between the last bond of one pair of bonds and the first bond of the next pair of bonds.

Accordingly, referring to FIGS. 2, the impulse heat sealing means 25 comprises the two opposing jaw members 18 and 19. The jaw members are mounted to the frame 28 of the sealing means 25 for movement between the first position and a second position. In the first position, the jaw members 18 and 19 are spaced-apart as illustrated in the figure. When the sealing means is actuated, the jaw members 18 and 19 move to the second position wherein the members are urged towards one another to compress a material disposed therebetween. The web of polyester film 26 is shown advancing between the spaced-apart jaw members 28 and 29. Referring now to FIG. 3, the folded web of polyester 26 is advanced along a predetermined path indicated by the arrow between the spaced-apart jaw members 17 and 18 by means of several pairs of rubber wheels 29 disposed on both sides of the jaw members along each of the folded edges of the folded web 26. One of the wheels of each pair of rubber wheels 29 is mounted on each side of the web 26 and the two wheels are urged against one another. The pairs or rubber wheels 28 are intermittently and simultaneously rotated in synchronism with the movement of the jaw members between the first and second positions to intermittently advance the folded web of polyester film 26 between the spaced-apart jaw members 18 and 19 of the impulse heat sealing means 25.

The layers of polyester 14 and 15 which transmits the energy for heating the polyester films to be bonded are shown in FIGS. 2–4. The layers of polyester 14 and 15 are strips of polyester having four separate layers of polyester in each strip. Two supply spools 30 and 31 are pivotally mounted on one side of the frame 28 for supplying the strips of polyester 14 and 15 in the direction of the arrows and two take-up spools 32 and 33 are mounted on the other side of the frame 29 for retrieving the unutilized portion of the strips, as will be described hereinafter. The strips of polyester 14 and 15 extend across the top and bottom of the folded web of polyester 26 and between the web and the respective jaw members 18 and 19 of the sealing means 25. Thus, when the impulse heat sealing means is actuated, the jaw members 18 and 19 are urged towards one another and press the strips of polyester 14 and 15 against the folded web of polyester film 26. The pressure from the jaw members compresses a portion of one surface of each polyester film 11 against a portion of one surface of the polyester film 10, thereby forming an interface between the contiguous portions.

Now referring to FIG. 4, a cross-sectional view of the jaw members 18 and 19 compressing the contiguous portions of the polyester films 10 and 11 is shown. As noted above, the strips of polyester 14 and 15 have four separate layers of polyester therein. Each jaw member 18 or 19 has two means 40 disposed adjacent the heating face 41 thereof for generating a pulse of heat when the impulse heat sealing means is actuated and the jaw members 18 and 19 have moved to the second position illustrated in FIG. 4. The two heat pulse generating means 40 in each jaw member 18 or 19 are spaced apart, extend substantially the length of the jaw member, and are disposed opposite the corresponding heat pulse generating means 40 in the other jaw member. Thus, the pulses of heat form each pair of opposing heat pulse generating means 40 are transmitted through one of the strips of polyester 14 or 15 and increase the temperature of the contiguous portions of the polyester films 10 and 11 along the separate portions 42 of the interface between the pair of opposing generating means 40. The temperature of the contiguous portions at the portions 42 of the interface is increased to a bonding temperature for the polyester, thus causing two separate, spaced-apart bonds to be formed between the contiguous portions of the polyester films 10 and 11 across the width of the folded web of polyester film 26. As the pulses of heat subsides, the pressure exerted by the jaw members 18 and 19 is preferably maintained to permit the two separate bonds to be securely formed between the polyester films 10 and 11.

Still referring to FIG. 4, one means for severing or trimming the bonds formed between the polyester films 10 and 11 thus forming separate bags from the folded web of polyester 26 is illustrated. The severing means 50 is mounted in the upper jaw member 19 of the impulse heat sealing means 25. The severing means 50 includes a cutter 51 having two separate blades 52 and 53. The two blades 52 and 53 of the cutter 51 extend across the width of the folded web of polyester 26 and slightly beyond each longitudinal folds formed therein. Each end of the blade 52 is curved in the direction of advance of the web, while each end of the blade 53 curves in the opposite direction. The purpose of having a pair of blades of this shape will be shown below. The cutter 51 is mounted within the upper jaw member 19 for movement between a first position and a second position in response to the position of the jaw members. When the jaw members 18 and 19 are spaced-apart, the cutter 51 is in the first position where it is withdrawn into the recess 54 in the upper jaw member 19, as illustrated by the dashed lines in FIG. 4. When the jaw members 18 and 19 are urged towards one another, the cutter 51 moves to the second position, as shown in the figure, where the blades 52 and 53 are extended for engagement with the respective grooves 55 and 56 in the heating surface 41 of the lower jaw member 18. Thus, the blades 52 and 53 sever the strips of polyester 14 and 15 and the folded web of polyester 26 along two spaced-apart planes between the two bonds formed at the interface of the contiguous portions of the polyester films 10 and 11.

As noted above, the bonds 60 and 61 are formed between the polyester films 10 and 11 across the width of the folded web of polyester 26. The two spaced-apart bonds 60 and 61 formed between the polyester films 10 and 11 of the folded web of polyester 26 are shown in FIG. 4. The dashed lines 62 and 63 therein are the lines along which the blades 52 and 53 of the cutter 51 sever the strips of polyester 14 and 15 and the folded web 26. Thus, once the strips of polyester 14 and 15 have been severed, thin ribbons of polyester 65 and 66 remain attached to the respective strips of polyester 14 and 15 at the one side of the impulse heat-sealing means 25. These ribbons of polyester 65 and 66 are wound up on the take-up spools 32 and 33, respectively, and serve to pull the strips of polyester 14 and 15 into position in preparation for forming the next pair of spaced-apart bonds in the folded web 26. Thus, a means for rotating the take-up spools 32 and 33 in the direction of the arrows (not shown) is synchronized with the jaw members 18 and 19 and the pairs of rubber wheels 29 so that the new strips of polyester 14 and 15 are being pulled or advanced adjacent both sides of the folded web of polyester 26 as the web is being advanced by the rubber wheels 29 between the spaced-apart jaw members 18 and 19 of the impulse heat-sealing means 25.

Once the folded web of polyester 26 has been advanced a predetermined distance, for example, the width of the bags or packages to be formed from the folded web 26 and new strips of polyester 14 and 15 are in position, the jaw members 18 and 19 of the heat-sealing means 25 can be actuated to form two more spaced-apart bonds 60 and 61 between the polyester films 10 and 11 across the width of the folded web 26. Two polyester bags 70 and 71 are thus formed in the folded web of polyester 26 between the bond 61 previously formed between the polyester films 10 and 11 and the new bond 60. Referring to FIG. 6, the two bags 70 and 71 are shown after the central portion of the folded web of polyester 27 between the two bonds 60 and 61 has been severed along the longitudinal axis 27 thereof.

Other means are available for sequentially advancing or pulling the strips of polyester 14 and 15 across the folded web of polyester 26 and into position for a bond to be formed therein. For example, FIG. 7 shows one modification of the impulse heat sealing means 25 of FIG. 2 which will also advance the strips of polyester 14 and 15 adjacent to each side of the folded web 26. The spaced-apart jaw members 18 and 19 and the two supply spools 30 and 31 for the strips of polyester 14 and 15 are provided as described in FIG. 2. The strips of polyester 14 and 15 pass between the pairs of guide rollers 75 and 76 and through two slots 77 and 78 on the one side of the impulse heat sealing means 25, thus positioning the strips of polyester 14 and 15 on the one side of the spaced apart jaw members 18 and 19. In addition, two pistons 79 and 80 are mounted on the other side of the impulse heat sealing means 25 so that the piston rods 81 and 82 of the respective pistons extend in planes parallel to the plane of the folded web of polyester and along paths perpendicular to the path of travel of the folded web of polyester 26. The piston rods have L-shaped members 83 and 84 mounted thereto for positioning the free ends of the strips of polyester 14 and 15 on the other side of the spaced apart jaw members 18 and 19. When the strips of polyester 14 and 15 are positioned as shown in FIG. 7, the impulse heat sealing means 25 can be actuated to form at least one bond across the width of the folded web of polyester 26 in the manner described above. In addition, the jaw members 18 and 19 include two cutting means 85 and 86 for cutting the strips of polyester 14 and 15 on both sides of the folded web 26 along lines parallel to the path of travel of the web. Once the strips of polyester are cut and the bond is formed in the web, the jaw members 18 and 19 can return to their spaced apart position and the folded web of polyester 26 can be advanced in preparation for the forming of another bond therein.

While the web of polyester 26 is advancing, the pistons are actuated and the piston rods 81 and 82 extend along paths on opposite sides of the folded web of polyester 26 with the portions 87 and 88 of the L-shaped members 83 and 84 passing between the folded web and one of the jaw member 18 or 19. When the piston rods 81 and 82 are fully extended, the L-shaped members 83 and 84 are adjacent the slots 77 and 78 in the frame 28 on the opposite side of the impulse heat sealing means 25, and the free ends of the strips of polyester 14 and 15 which are extending therethrough. A gripper 89 on the portion 87 of the L-shaped member 83 on the upper piston rod 81 grips the free end of the strip of polyester 15 which is held by the upper slot 77 and similar lower gripper 90 on the lower piston rod 82 grips the free end of the strip of polyester 14. Thus, as the piston rods 81 and 82 are subsequently being retracted to the positions shown in FIG. 7, the grippers 89 and 90 pull the free ends of the strips of polyester 14 and 15 with them thereby placing one strip of polyester 14 or 15 between each of the spaced-apart jaw members 18 and 19 and the portion of the folded web of polyester 26 therebetween. Once the pistons are fully retracted and the web of polyester has been advanced, another bond can be formed therein.

As noted above, a bond can also be formed between the contiguous portions of films of resinous material by energy transmitted through at least one layer of resinous material on only one side of the polyester films. For example, one means for bonding two polyester films 10 and 11 by applying heat to the contiguous portions of the films through four layers of polyester 14 on only one side of the polyester films is shown in FIG. 8. The jaw members 18 and 19 apply pressure to compress the contiguous portions of the polyester films 10 and 11 along their interface. Unlike the jaw members 18 and 19 of FIG. 4, heat is only applied by one heating means 40 disposed in jaw member 18 to raise the temperature of the contiguous portions along their interface to a bonding temperature for the polyester, thus forming a bond between the polyester films 10 and 11.

Although the bond formed between the polyester films described above have been formed by providing layers of polyester through which the energy is transmitted, layers of a fluorocarbon resin material such as Teflon can also be used for the bonding of polyester films. However, unlike the layers of polyester, the layers of a fluorocarbon resin material will not be bonded to the polyester films. Therefore, the same layers of a fluorocarbon resin material can be used to form several bonds in the polyester films. Thus, referring to FIG. 9, a modified form of an upper jaw member 18 is shown which has a sheet of a fluorocarbon resin material 90 attached thereto. The sheet 95 extends substantially the length of the jaw member 18 and is preferably a plurality of separate layers, for example, four layers of a fluorocarbon resin material. A supply roll 96 of the fluorocarbon resin material sheet 15 is mounted on the top of the jaw member 18 and the sheet of a fluorocarbon resin material extends from the supply roll 96 around the heating face 41 of the jaw member 18 to the recovery roll 97. A means (not shown) for incrementally unwinding the sheet 95 from the supply roll 96 to the recovery roll 97 is preferably provided to advance the sheet of a fluorocarbon resin material 95 across the heating face 41 of the jaw member 18 in response to actuation of the impulse heat sealing means 25. Thus, a layer of a fluorocarbon resin material 95 is always disposed between the heating means 40 of the jaw member and the polyester films 10 and 11 to be bonded to one another. The incremental advance is such that a portion of the sheet of a fluorocarbon resin material 95 is used for forming only several bonds, for example, 5 or 6 bonds, before it is wound past the face 41 and onto the recovery roll 97.

EXAMPLE 1

By way of example, two polyester films each approximately 0.0005 inches thick were placed with a portion of one surface of one of the films contiguous with a portion of one surface of the other film. The contiguous portions of the polyester films were placed between the jaw members of an impulse heat-sealing means. One layer of Teflon approximately 0.002 inches thick was placed between each of the jaw members of an impulse heat sealing means and the other surface of each polyester film. The jaw members compressed the layers of polyester and the polyester films with a sealing pressure of about 10–12 pounds per linear inch of seal, and a pulse of heat was applied to the contiguous portions of the polyester films through the layer of Teflon on each side of the film. The heat pulse had a duration of about 3½ seconds, and the jaw members continued to compress the polyester films for about 5 seconds after the heat pulses were discontinued. When the pressure was also removed, a bond was formed between the contiguous portions of the polyester films; however, a bond was not formed between the two polyester films and the layer of Teflon on either side thereof.

FIGS. 10, 12, 14, 17 and 18 illustrate several ways that the layers of polyester 14 and 15 can be formed adjacent the polyester films 10 and 11 to be bonded. Thus, referring to FIG. 10, one layer of polyester 14 or 15 is formed adjacent the other surface 100 or 101 of each of the two polyester films 10 and 11 with a portion thereof opposite the portions 102 and 103 of the one surfaces 104 and 105 to be bonded to one another. The layers of polyester 14 and 15 are a continuation of the polyester films 10 and 11 which are folded in opposite directions above the portions 102 and 103 thereof to be bonded so as to overlie the portions. By way of example, in the heat sealing means 25 of FIG. 2, the jaw members 18 and 19 could apply pressure and heat to the layers of polyester 14 and 15 at the points indicated by the arrows in FIG. 10 and the bond formed thereby could subsequently be severed along the dashed line, thus forming the seal between the polyester films 10 and 11 illustrated in FIG. 11.

FIG. 12 illustrates another way of forming the layers of polyester 14 and 15 adjacent and opposite the portions 102 and 103 of the polyester films 10 and 11 to be bonded to one another. In the figure, two layers of polyester 106 and 107 or 108 and 109 are provided on each of the opposite sides of the two polyester films 10 and 11. The layers of polyester 106 and 109 and the two layers 107 and 108 are formed from two continuous layers of polyester wrapped around the free ends of the two polyester films 10 and 11. As described above, the pressure and heat can be applied to the additional layers of polyester 14 and 15 at the points indicated by the arrows. The seal formed when the bond formed thereby has been subsequently severed along the dashed lines is illustrated in FIG. 13.

Figure 17:
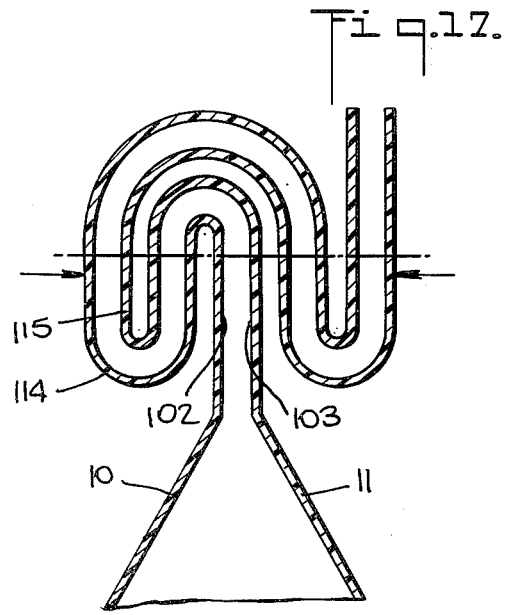
FIG. 17 shows another means of assembling two films of resinous material to be bonded to one another and four layers of resinous material on each of the opposite sides of the two films.
Figure 18:
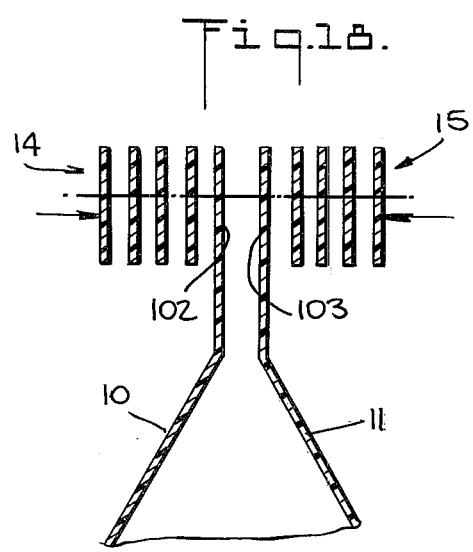
FIG. 18 shows still another means of assembling two films of resinous material to be bonded to one another and four layers of resinous material on each of the opposite sides of the two films.

FIGS. 14, 17 and 18 illustrate several ways that four layers of polyester 14 and 15 can be formed on each of the opposite sides of the polyester films 10 and 11. Referring first to FIG. 14, the four layers of polyester 14 or 15 on each side of the polyester films 10 and 11 are formed from a single layer of polyester 110 or 111 folded in the shape of a "W" so as to provide four additional layers of polyester adjacent and opposite each of the portions 102 and 103 of the polyester films 10 and 11 to be bonded to one another. FIG. 15 shows the four layers of polyester 14 and 15 of FIG. 7 after the layers have been compressed by the jaw members 18 and 19 the bonding means of FIG. 1, thus placing the portions 102 and 103 of the polyester films 10 and 11 contiguous with one another. FIG. 16 illustrates the seal that can be formed from the polyester films 10 and 11 illustrated in FIG. 14 and 15 after the contiguous portions of the polyester films 10 and 11 have been bonded to one another and the bond has been severed along the dashed lines in FIGS. 14 or 15.

FIG. 17 illustrates another way of forming four layers of polyester 14 and 15 on each of the opposite sides of the polyester films 10 and 11. As shown therein, the layers of polyester 14 and 15 are formed from continuous portions 115 and 116 of the polyester films 10 and 11. When the portions 115 and 116 are folded as shown in FIG. 17, they provide four layers of polyester 14 and 15 on each of the opposite sides of the two polyester films 10 and 11.

EXAMPLE 2

By way of example, two polyester films each approximately 0.0008 inches thick were placed with a portion of one surface of the films contiguous with a portion of one surface of the other film. The contiguous portions of the polyester films were placed between the jaw members of an impulse heat-sealing means and four layers of polyester each approximately 0.0008 inches thick were placed between each of the jaw members and the other surface of each polyester film. The layers of polyester were formed adjacent the polyester films as shown in FIG. 17. The jaw members compressed the layers of polyester and the polyester films with a sealing pressure of about 10–12 pounds per linear inch of seal, and a pulse of heat was applied to the contiguous portions of the polyester films through the four layers of polyester on each side of the films. The heat pulse had a duration of about 2½ seconds, and the jaw members continued to compress the polyester films for about 5 seconds after the heat pulse ended. When the pressure was also removed, a bond was formed between the contiguous portions of the polyester films, and a bond was also formed between the two polyester films and the four layers of polyester on each side thereof.

EXAMPLE 3

By way of further example, two polyester films each approximately 0.0005 inches thick and eight layers of polyester each approximately 0.0005 inches thick were placed between the jaw members of an impulse heat-sealing means as described in Example 2. The jaw members compressed the layers of polyester and the polyester films with a sealing pressure of about 10–12 pounds per linear inch of seal, and a pulse of heat was applied to the contiguous portions of the polyester films through the four layers of polyester on each side of the films. The heat pulse had a duration of about 2½ seconds, and the jaw members continued to compress the polyester films for about 5 seconds after the heat pulse ended. When the pressure was also removed, a bond was formed between the contiguous portions of the polyester films, and a bond was also formed between the two polyester films and the four layers of polyester on each side thereof.

Figure 20:
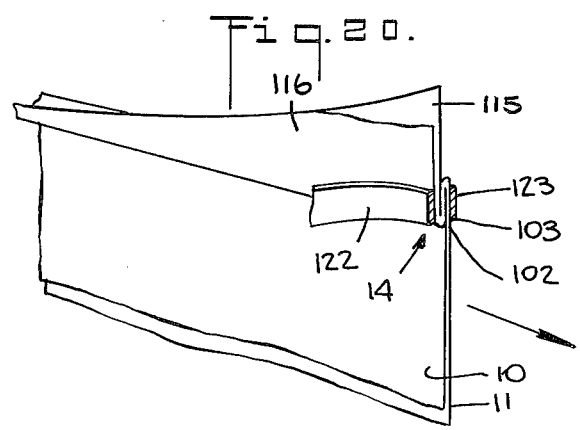
Figure 21:
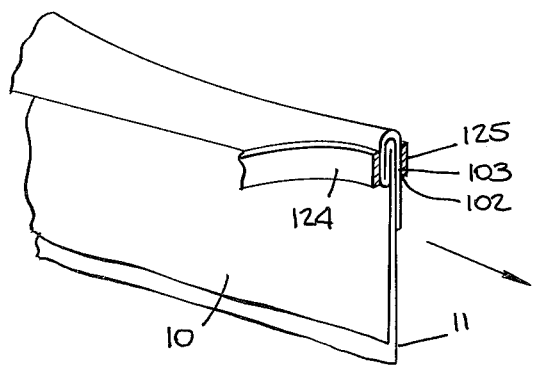
Figure 22:
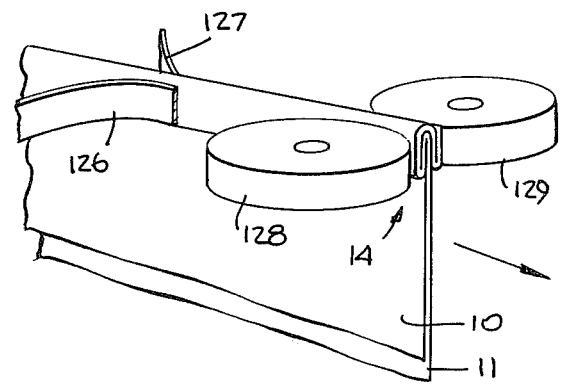

FIGS. 19–21 illustrate one means for folding the continuous portions 115 and 116 of the polyester films 10 and 11 to form the four layers of polyester 14 and 15 shown in FIG. 17. Referring to FIG. 19, the two polyester films 10 and 11, advancing along a predetermined path indicated by the arrow, are folded by fingers or guides 120 and 121 so that the continuous portions 115 and 116 of the polyester films overlie the contiguous portions 102 and 103 of the polyester films 10 and 11 to be bonded, thus forming two layers of polyester of one side of the polyester films 10 and 11. Next, guides 122 and 123 fold the continuous portions 115 and 116 back on themselves so that four layers of polyester 14 are formed on one side of the polyester films 10 and 11 as shown in FIG. 20. Referring now to FIG. 21, the continuous portions 115 and 116 are subsequentially folded by guides 124 and 125 so that the continuous portions 115 and 116 also overlie the contiguous portions 102 and 103 on the other side of the polyester films 10 and 11, thus forming two layers of polyester on that side of the films. Finally, as shown in FIG. 22, guides 126 and 127 fold the continuous portions 115 and 116 of the polyester films 10 and 11 back on themselves so that four layers of polyester 14 and 15 are alternately formed on each side of the polyester films 10 and 11. The guide rollers 128 and 129 can then advance the polyester films 10 and 11 and the layers of polyester 14 and 15 formed to a bonding means where a bond can be formed between the contiguous portions 102 and 103 of the films.

Finally, FIG. 18 illustrates still another way of providing four layers of polyester 14 and 15 adjacent the polyester films 10 and 11 and opposite the portions 102 and 103 thereof to be bonded to one another. As illustrated therein, each of the four layers of polyester 14 and 15 are separate and distinct from the other layers of polyester.

As noted above, a bond can be formed between films of resinous material by transmitting ultrasonic vibrational energy through layers of resinous material on each side of the layers to be bonded. By way of example, one type of ultrasonic vibrating means is disclosed in U.S. Pat. No. 3,224,915, issued Dec. 21, 1965. Referring to FIG. 23, an ultrasonic vibrating means 140 is illustrated forming a bond between two films of a resinous material such as polyester films 10 and 11. The vibrating means 140 comprising a stationary anvil 141 and an ultrasonic vibrating member 142. The member 142 vibrates in the directions indicated by the arrows. Four layers of polyester 14 and 15 are placed between the polyester films 10 and 11 to be bonded and the anvil 141 and vibrational member 142, respectively. When the vibrating means is actuated, the ultrasonic vibrations of the member 142 compress the contiguous portions 102 and 103 of the polyester films 10 and 11 along their interface and generate heat which increases the temperature of the contiguous portions of the polyester films 10 and 11 along their interface to a temperature at least as high as the bonding temperature of the resinous material, thus forming a bond between the polyester films.

EXAMPLE 4

By way of example, two polyester films each approximately 0.00092 inches thick and eight layers of polyester each approximately 0.00092 inches thick were formed as described in Example 2. The polyester films and the layers of polyester were placed between the anvil and the vibrator of an ultrasonic welding machine of the type generally illustrated in FIG. 23. The anvil was a one-eighth inch wide wheel having a diameter of 3 3/16 inches. The vibrator had a crowned working surface having a 10 inch radius and it vibrated with an amplitude of approximately 0.001 inches. The vibrator and anvil were urged towards one another with a 90 pound force. Whe the polyester films and the layers of polyester were advanced between the vibrator and the anvil at about 1 inch per second, a bond was formed between the contiguous portions of the polyester films, and a bond was also formed between the films and the layers of polyester on each side thereof.

Other modifications and variations of the invention will be apparent to those skilled in the art, and they may be made without departing from the spirit and scope of the present invention which is claimed herein.

I claim:

1. A seal formed between at least two films of resinous material having a portion of at least one surface of each film of resinous material being contiguous with a portion of a surface of another film of resinous material, the seal comprising a bond formed between each of the contiguous portions of the surfaces of the films of resinous material, the bond being formed by heating and compressing the contiguous portions of the films of resinous material, the contiguous portions of the films of resinous material being compressed by pressure applied to additional outermost layers of resinous material disposed adjacent the other surfaces of each of the contiguous films of resinous material and opposite to the contiguous portions thereof, the contiguous portions of the surfaces of the films of resinous material while compressed being heated to a temperature at least as high as the bonding temperature of the resinous material of the films through the layers of resinous material adjacent thereto by energy applied to each of the other surfaces of the outer films of resinous material, said outermost layers being adhered to the other surfaces of the contiguous films.

2. A method for bonding portions of first and second films of polyester resinous material to one another, the polyester resinous material being of a type which is not bondable by application of conductively transferred heat and pressure directly to only the two films by reason of deterioration of the two films about the periphery of the seal zone when the heat and pressure are applied, the method comprising the steps of:

a. providing at least first and second films of polyester resinous material to be bonded to one another and at least one direct-heat isolating film of polyester resinous material;

b. disposing a portion of one surface of the first film of polyester resinous material contiguous with a portion of one surface of the second film of polyester material for forming an interface between the contiguous portions;

c. placing one surface of the direct-heat isolating film of polyester resinous material adjacent the other surface of the portion of at least one of the first and second films of polyester resinous material disposed contiguous with the portion of the other film of polyester resinous material, the one surface of the direct-heat isolating film of polyester resinous material being exposed;

d. compressing the contiguous portions of the first and second films of polyester resinous material against one another along the interface thereof by pressure applied to the exposed other surface of the direct-heat isolating film of polyester resinous material;

e. applying energy for conductively heating the contiguous portions of the first and second films of polyester resinous material along their interface to raise the temperature thereof to at least the bonding temperature of the polyester resinous material of the first and second films of polyester resinous material and to cause a bond to be formed between the contiguous portions of the first and second films of polyester resinous material, the energy being applied by a member having a face portion which is moved directly into contact with the other surface of the direct-heat isolating film of polyester resinous material for conductively transmitting energy for heating by conduction through the exposed other surface of the direct-heat isolating film of polyester resinous material, the applied energy being sufficient to fuse the direct-heat isolating film of polyester resinous material against the other surface of the one of the first and second films of polyester resinous material to enhance the transfer of energy for heating the contiguous portions of the first and second films to the bonding temperature while causing the direct-heat isolating film to be bonded to the other surface, the direct-heat isolating layer preventing the region of the first and second films adjacent the bond formed therein from being raised to a temperature which would cause degradation thereof; and f. discharging the bonded first and second films of polyester resinous material and the bonded direct-heat isolating film of polyester resinous material through which the energy has been applied from the location at which the bond is formed.

3. A method in accordance with claim 2 in which the contiguous portions of the first and second films of resinous material remain compressed against one another when the energy applied through the direct-heat isolating film of polyester resinous material for heating the contiguous portions of the first and second films of resinous material is terminated.

4. A method in accordance with claim 2 in which the step of placing a direct-heat isolating film of polyester resinous material adjacent the other surface of the portion of at least one of the first and second films of polyester material comprises placing at least two direct-heat isolating films of polyester resinous material, each of the direct-heat isolating films of polyester resinous material being placed adjacent the other surface of a different one of the first and second films of resinous material opposite the contiguous portions of the first and second films of resinous material, the energy for heating the contiguous portions of the direct-heat isolating films of polyester resinous material along their interface being applied through each of the direct-heat isolating films of polyester resinous material.

5. A method in accordance with claim 4 and further comprising an even number of direct-heat isolating films of polyester resinous material, one-half of the even number of direct-heat isolating films of polyester resinous material being placed on each of the opposite sides of the first and second films of resinous material and adjacent the other surface of the film of resinous material on the respective side a portion of one surface of one of the direct-heat isolating films of polyester resinous material on each side of the first and second films of resinous material being contiguous with the other surface of a film or resinous material opposite the contiguous portions of the first and second films of resinous material each of the other direct-heat isolating films of polyester resinous material on each side of the first and second films of resinous material being contiguous with a portion of a surface of another of the direct-heat isolating films of polyester resinous material, the direct-heat isolating films of polyester resinous material being contiguous with one another opposite the contiguous portions of the first and second films of resinous material, the energy for heating the contiguous portions of the direct-heat isolating films of polyester resinous material along their interface being applied through the direct-heat isolating films of polyester resinous material on each of the opposite sides of the first and second films of resinous material.

6. A method in accordance with claim 5 and further defined wherein eight direct-heat isolating films of polyester resinous material are provided, four of the direct-heat isolating films of polyester resinous material being placed on each of the opposite sides of the first and second films of resinous material.

7. A method in accordance with claim 4 and further defined wherein each of the first and second films of resinous material have approximately the same thickness.

8. A method in accordance with claim 7 in which each of the direct-heat isolating films of polyester resinous material have approximtely the same thickness as the thickness of each of the first and second films of resinous material.

9. A method in accordance with claim 4 in which at least one of the direct-heat isolating films of resinous material adjacent to the other surface of at least one of the first and second films of resinous material is folded over from a continuous portion of one of the first and second films of resinous material.

10. A method in accordance with claim 4 in which at least two of the direct-heat isolating films of polyester resinous material on at least one side of the first and second films of resinous material are folded over from a single continuous sheet of resinous material.

11. A method in accordance with claim 4 in which the contiguous portions of the first and second films of resinous material are compressed against one another along their interface by pressure applied to the direct-heat isolating films of polyester resinous material on both sides of the first and second films of resinous material.

12. A method in accordance with claim 4 in which the energy applied through direct-heat isolating films of polyester resinous material for heating the contiguous portions of the first and second films of resinous material along their interface is heat, the heat being applied to the outermost expendable film of resinous material on both sides of the first and second films of resinous material.

13. A method in accordance with claim 4 in which the energy applied through the direct-heat isolating films of polyester resinous material on both sides of the first and second films of resinous material for heating the contiguous portions of the first and second films of resinous material along their interface is ultrasonic energy.

* * * * *

UNITED STATES PATENT AND TRADEMARK OFFICE
CERTIFICATE OF CORRECTION

PATENT NO. : 3,956,045
DATED : May 11, 1976
INVENTOR(S) : LOUIS S. HOFFMAN

It is certified that error appears in the above-identified patent and that said Letters Patent are hereby corrected as shown below:

Col. 5, line 13, "one" should be --on--;

Col. 5, line 27, "is" should be --being--;

Col. 5, line 37, "film" should be --films--;

Col. 6, lines 64 and 65, "28 and 29" should be --18 and 19--;

Col. 9, line 54, after "and", insert -- a --.

Col. 11, lines 65 and 66, "showon" should be --shown in--;

Col. 8, line 33, "FIG. 4" should be --FIG. 5--;

Col. 9, line 21, after "polyester" insert --26--;

Col. 13, line 53, change "Whe" to --When--.

Signed and Sealed this

Twenty-seventh Day of July 1976

[SEAL]

Attest:

RUTH C. MASON
*Attesting Officer*

C. MARSHALL DANN
*Commissioner of Patents and Trademarks*